(12) United States Patent
Proehl et al.

(10) Patent No.: US 6,577,350 B1
(45) Date of Patent: Jun. 10, 2003

(54) METHOD AND APPARATUS FOR DISPLAYING AN ELECTRONIC PROGRAM GUIDE

(75) Inventors: Andrew M. Proehl, New York, NY (US); Franklin Servan-Schreiber, New York, NY (US); Anne Kim, New York, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/217,671

(22) Filed: Dec. 21, 1998

(51) Int. Cl.[7] ............................................. H04N 5/445
(52) U.S. Cl. .................. 348/564; 348/569; 348/561; 348/460; 348/906; 725/39; 345/719; 345/726
(58) Field of Search ................................ 348/569, 564, 348/563, 561, 460, 461, 906, 704, 240, 239, 578, 581, 584, 586; 725/39, 40, 43, 57, 59; 345/719, 718, 726

(56) References Cited

U.S. PATENT DOCUMENTS

| | | | |
|---|---|---|---|
| 4,751,578 A | 6/1988 | Reiter et al. | |
| 4,855,833 A | 8/1989 | Kageyama et al. | |
| 4,977,455 A | 12/1990 | Young | |
| 5,001,697 A | 3/1991 | Torres | |
| 5,040,067 A | 8/1991 | Yamazaki | |
| 5,179,641 A | 1/1993 | Comins et al. | |
| 5,223,924 A | 6/1993 | Strubbe | |
| 5,253,066 A | 10/1993 | Vogel. | |
| 5,283,561 A | 2/1994 | Lumelsky et al. | |
| 5,315,392 A | 5/1994 | Ishikawa et al. | |
| 5,317,403 A | 5/1994 | Keenan | |
| 5,323,234 A | 6/1994 | Kawasaki | |
| 5,341,466 A | 8/1994 | Perlin et al. ................. 395/139 |
| 5,353,121 A | 10/1994 | Young et al. | |
| 5,398,074 A | 3/1995 | Duffield | |
| 5,416,508 A | 5/1995 | Sakuma et al. | |
| 5,436,676 A | 7/1995 | Pint et al. | |
| 5,442,410 A | * 8/1995 | Jun ............................ 348/581 |
| 5,465,113 A | 11/1995 | Gilboy | |
| 5,485,197 A | 1/1996 | Hoarty .......................... 348/7 |
| 5,502,504 A | 3/1996 | Marshall et al. | |
| 5,512,955 A | 4/1996 | Toyoshima et al. | |
| 5,513,342 A | 4/1996 | Leong et al. | |
| 5,523,796 A | 6/1996 | Marshall et al. | |
| 5,524,195 A | 6/1996 | Clanton, III et al. | |
| 5,528,304 A | 6/1996 | Cherrick et al. | |
| 5,532,753 A | 7/1996 | Buchner et al. | |
| 5,532,754 A | 7/1996 | Young et al. | |
| 5,541,738 A | 7/1996 | Mankovitz | |
| 5,544,288 A | 8/1996 | Morgan et al. | |
| 5,557,338 A | * 9/1996 | Maze et al. ................. 348/569 |
| 5,559,548 A | 9/1996 | Davis et al. | |
| 5,559,550 A | 9/1996 | Mankovitz | |
| 5,585,838 A | 12/1996 | Lawler et al. | |
| 5,586,866 A | 12/1996 | Miller et al. | |
| 5,589,892 A | 12/1996 | Knee et al. | |
| 5,594,509 A | 1/1997 | Florin et al. | |
| 5,596,373 A | 1/1997 | White et al. | |

(List continued on next page.)

FOREIGN PATENT DOCUMENTS

JP          0 267 020 A2     4/1987

Primary Examiner—John Miller
Assistant Examiner—Jean W. Désir
(74) Attorney, Agent, or Firm—Blakely, Sokoloff, Taylor & Zafman LLP

(57) ABSTRACT

A method and apparatus for adjusting font size in an electronic program guide display are provided. A multiple channel broadcasting system generates an electronic program guide identifying channels and corresponding programs in a broadcasting system. The broadcast system determines a number of characters to be displayed in an area of an electronic program guide. The broadcast system determines a number of display pixels available for display of the characters. The broadcast system adjusts the font size of the characters to display the number of characters within the number of pixels available.

42 Claims, 13 Drawing Sheets

U.S. PATENT DOCUMENTS

| | | | | |
|---|---|---|---|---|
| 5,598,520 | A | 1/1997 | Harel et al. | |
| 5,619,249 | A | 4/1997 | Billock et al. | 348/7 |
| 5,621,456 | A | 4/1997 | Florin et al. | |
| 5,625,406 | A | 4/1997 | Newberry et al. | |
| 5,650,826 | A | 7/1997 | Eitz | |
| 5,671,411 | A | 9/1997 | Watts et al. | |
| 5,687,331 | A * | 11/1997 | Volk et al. | 345/823 |
| 5,703,795 | A | 12/1997 | Mankovitz | |
| 5,710,601 | A | 1/1998 | Marshall | |
| 5,719,637 | A | 2/1998 | Ohkura | |
| 5,731,844 | A | 3/1998 | Rauch et al.. | |
| 5,737,029 | A | 4/1998 | Ohkura | |
| 5,745,909 | A | 4/1998 | Perlman et al. | |
| 5,754,651 | A | 5/1998 | Blatter et al. | 380/20 |
| 5,760,772 | A | 6/1998 | Austin | |
| 5,781,246 | A | 7/1998 | Alten et al. | |
| 5,796,407 | A | 8/1998 | Rebiai et al. | |
| 5,798,760 | A | 8/1998 | Vayda et al. | 345/352 |
| 5,801,747 | A | 9/1998 | Bedard | |
| 5,809,204 | A | 9/1998 | Young et al. | |
| 5,825,368 | A | 10/1998 | Wilks | |
| 5,828,420 | A * | 10/1998 | Marshall et al. | 348/586 |
| 5,844,620 | A | 12/1998 | Coleman et al. | 348/461 |
| 5,850,218 | A | 12/1998 | LaJoie et al. | 345/327 |
| 5,880,768 | A | 3/1999 | Lemmons et al. | |
| 5,892,521 | A | 4/1999 | Blossom et al. | 345/501 |
| 5,909,212 | A | 6/1999 | Nishina et al. | |
| 5,929,932 | A | 7/1999 | Otsuki et al. | 348/569 |
| 5,940,073 | A | 8/1999 | Klosterman et al. | 345/327 |
| 5,945,987 | A | 8/1999 | Dunn | 345/327 |
| 5,959,624 | A * | 9/1999 | Johnston et al. | 345/746 |
| 5,963,206 | A * | 10/1999 | Ulrich et al. | 345/788 |
| 5,966,121 | A * | 10/1999 | Hubbell et al. | 345/726 |
| 5,973,682 | A | 10/1999 | Saib et al. | |
| 5,995,092 | A * | 11/1999 | Yuen et al. | 345/716 |
| 5,995,155 | A | 11/1999 | Schindler et al. | |
| 6,002,394 | A * | 12/1999 | Schein et al. | 345/719 |
| 6,005,561 | A | 12/1999 | Hawkins et al. | |
| 6,005,601 | A | 12/1999 | Ohkura et al. | |
| 6,016,144 | A | 1/2000 | Blonstein et al. | |
| 6,018,372 | A * | 1/2000 | Etheredge | 348/569 |
| 6,023,267 | A | 2/2000 | Chapuis et al. | |
| 6,025,837 | A | 2/2000 | Matthew, III et al. | |
| 6,034,677 | A * | 3/2000 | Noguchi et al. | 345/719 |
| 6,111,614 | A * | 8/2000 | Mugura et al. | 345/592 |
| 6,133,962 | A * | 10/2000 | Proehl et al. | 348/569 |
| 6,137,539 | A * | 10/2000 | Lownes et al. | 348/569 |
| 6,147,714 | A * | 11/2000 | Terasawa et al. | 348/564 |
| 6,188,432 | B1 * | 2/2001 | Ejima | 345/660 |
| 6,243,645 | B1 * | 6/2001 | Moteki et al. | 340/988 |
| 6,275,260 | B1 * | 8/2001 | Anderson | 348/232 |
| 6,373,530 | B1 * | 4/2002 | Birks et al. | 348/239 |
| 6,392,710 | B1 * | 5/2002 | Gonsalves et al. | 348/441 |

* cited by examiner 1 1/2-HOUR PROGRAM GUIDE WITH LOGO DISPLAY

| GUIDE | | 3 | 3:20PM | 3:30 |
|---|---|---|---|---|
| aab 100 | | LateNite with David Letter... | | Nova △ |
| aat 175 | ◁Primetime | | Beauty & the Beast | △ |
| 🐭 237 | ◁Little Witch | | Saturday Nite Live | |
| 🛩 366 | House of Style | | | Coach |
| A&E 569 | ◁Dateline | | 20/20 | Nanny △ |
| ⓐⓑⓒ 339 | Seinfeild | | Men Behaving Badly | |
| AMC 583 | Xena | | Hercules | Singled Out △ |

IN THIS MODE, 1 1/2 HOURS OF PROGRAMMING IS DISPLAYED HORIZONTALLY, WHILE 7 CHANNELS AND THEIR LOGOS ARE DISPLAYED TOP TO BOTTOM.

FIG. 11

1-DAY PROGRAM DISPLAY WITH ALPHA DIRECTORY

| GUIDE | MORNING | AFTERNOON | EVENING | LATENIGHT |
|---|---|---|---|---|
| A | | ○ | | |
| B | | ○ | | |
| C | | ○ | | |
| D | | | ○ | |
| E | | | ○ | |
| F | ○ | | | |
| G | | ○ | | |
| H | | | | |
| I | | ○ | | |
| J | | | | ○ |

A-C  D-F  C-H  I-L  M-N  O-R  S-T  L-V  W-Z  0-9

IN THIS VIEW, AN ENTIRE DAY IS DISPLAYED ACROSS THE TOP, AND AN ALPHABETICAL DIRECTORY IS DISPLAYED VERTICALLY. THIS VIEW IS ACCESSED BY PRESSING "ZOOM OUT" WHILE IN THE 6-HOUR VIEW.

FIG. 13

METHOD AND APPARATUS FOR DISPLAYING AN ELECTRONIC PROGRAM GUIDE

FIELD OF THE INVENTION

The present invention relates to the presentation of channel, program, and broadcast information for a multiple channel television broadcast system.

BACKGROUND OF THE INVENTION

Television broadcasting technology has improved tremendously since its inception. Today, television signals are broadcast on the airwaves, through cables, and via satellite. The number of stations accessible today has increased to hundreds of stations. To select a program to view, many viewers simply "channel surf" until they find a channel that has a desirable program. Channel surfing refers to the process of using the channel "+" or "−" key to sequentially view each channel. Although some viewers find channel surfing among hundreds of stations enjoyable, most viewers prefer a more direct method for selecting a program to view. Therefore, a number of broadcast systems and receivers provide electronic program guides (EPGs) for a viewer access.

Some systems switch between displays of an EPG or a broadcast of a program. Other systems use decimation techniques to provide a reduced-sized broadcast image which is displayed concurrently with an EPG. However, current systems do not provide a visible link between different types of program guides. Thus a viewer may get lost switching between programs and EPGs. Thus it is desirable to provide a way to visually connect the current program to the EPG displaying an entry of the current program.

Furthermore, typical systems provide for an EPG of a single format. If multiple formats are provided, each format is represented by a separate screen displays.

SUMMARY OF THE INVENTION

A method and apparatus for visually connecting a displayed program and an electronic program guide (EPG). In one embodiment, the apparatus includes a first receiver that receives image signals such as those received from a broadcast network. A tuner selects images or a channel broadcast to display. A second receiver receives control signals, such as those generated by a user using a remote control device. When a control signal is received indicating that the user wishes to view a program guide, a controller performs a zoom from the broadcast displayed to the electronic program guide. Once the zoom is complete, the broadcast is alpha-blended behind the program guide. This innovative process of zooming between a broadcast and the program guide provides the user a visual link between the two such that user does not get lost or confused in the transition.

In an alternate embodiment, multiple levels of detail of program guide information is selectable by the user. A zoom function is provided that enables the use to zoom in or zoom out. In response the apparatus performs an program guide zoom function in which the level of detail of the program guide is expanded or compressed. In one embodiment, at a determined point in the zoom, a certain level of detail is changed by fading in/out the new representation/old representation. For example, when going from a first level of detail containing station logos, to a second level of detail, the logos are replaced by the alphabetic abbreviation for the station network, by fading out the logos and fading in the abbreviation.

BRIEF DESCRIPTION OF THE DRAWINGS

The objects, features, and advantages of the present invention will be apparent to one skilled in the art from the following detailed description in which:

FIG. 11 illustrates the display of an electronic program guide at one level of detail in one embodiment of the present invention.

FIG. 13 illustrates the display of an electronic program guide at a third level of detail in one embodiment of the present invention.

DETAILED DESCRIPTION OF THE INVENTION

In the method and apparatus of the present invention the broadcast system described is a direct broadcast satellite system. However, it is readily apparent to one skilled in the art that other broadcast systems and formats including digital televisions, high definition televisions and video systems and computer systems, which have the capability of processing broadcast or image signals, may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

Figure 1:
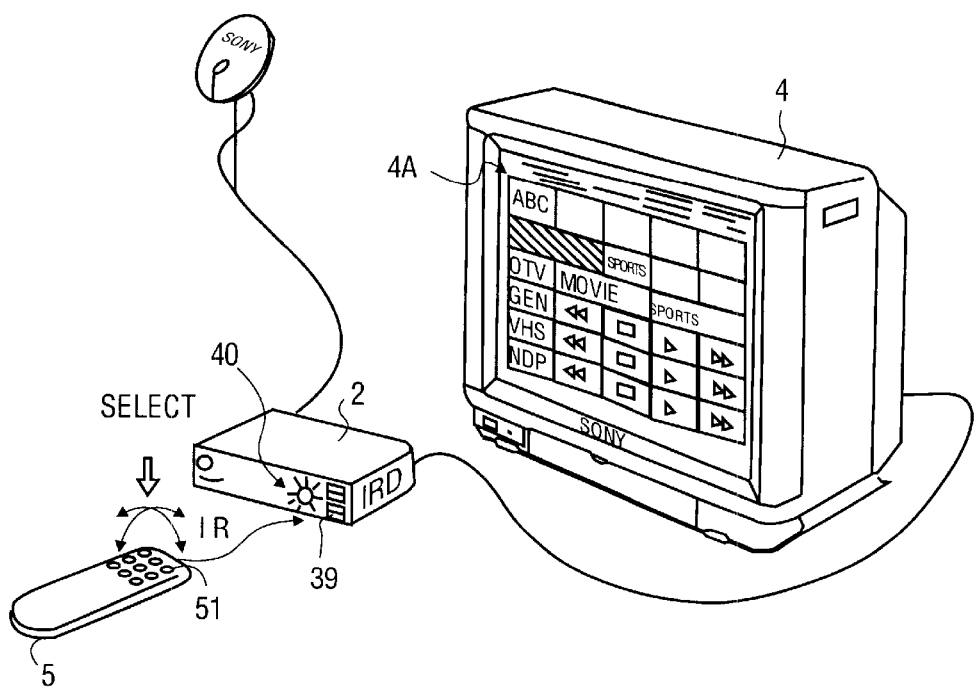
FIG. 1 is a simple illustration of one embodiment of the present invention.

FIG. 1 is a simplified diagram illustrating a Direct Satellite System (DSS). The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. A tuner 21 of a decoder is tuned in to the frequency of the transponder corresponding to a channel, which is designated by a viewer so that the packets of digital data are received by the decoder.

The antenna 3 receives an encoded data signal sent from a satellite. The received encoded signal is decoded by the IRD. The antenna 3 has a low noise block down converter 3a (LNB). The LNB 3a converts a frequency of a signal sent from the satellite to another frequency. The converted signal is supplied to the IRD 3. The monitor 4 receives a signal from the IRD 3.

Figure 2:
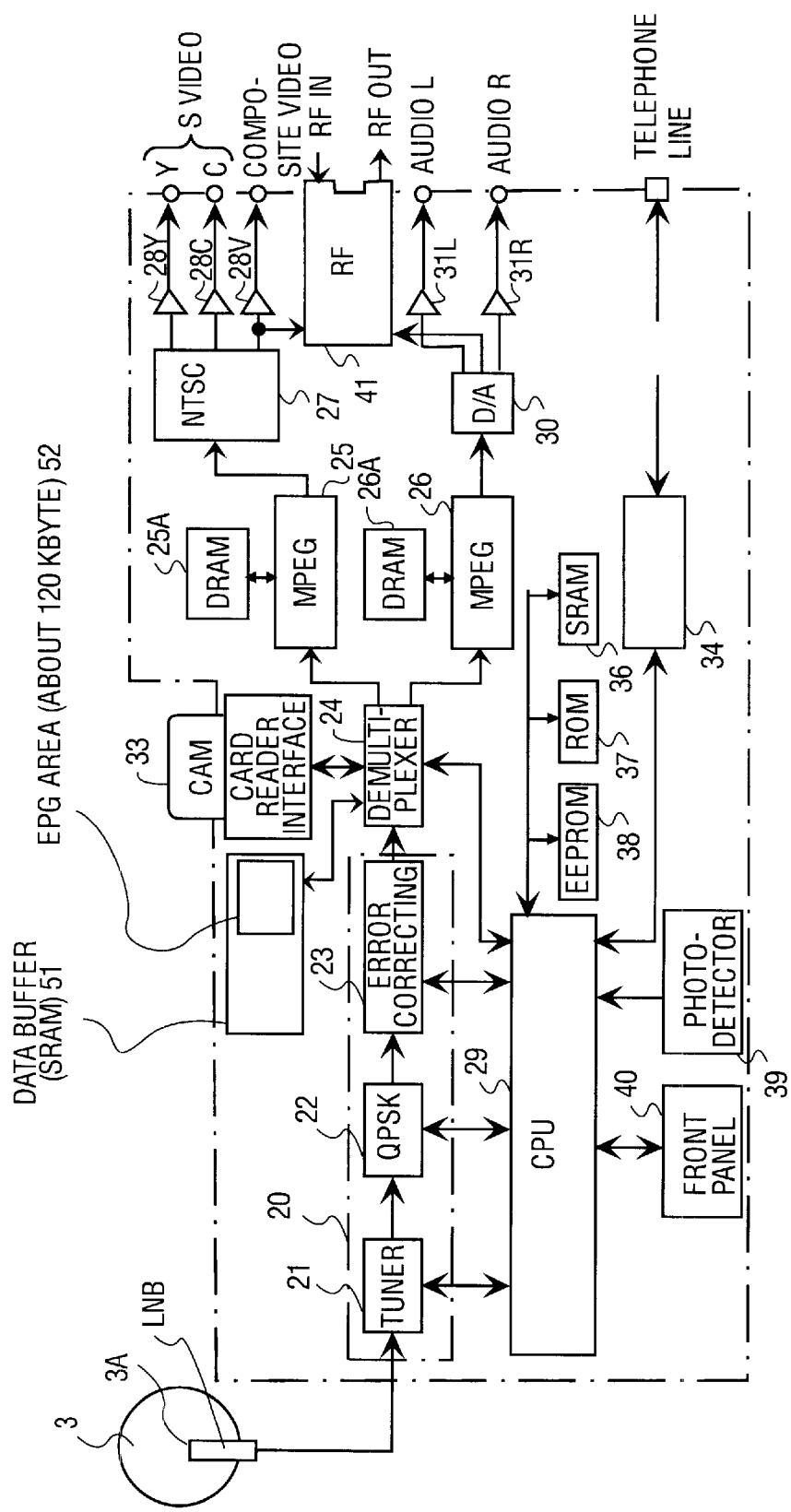
FIG. 2 is a block diagram representation of the elements utilized in the receiver of the television signals.
Figure 3:
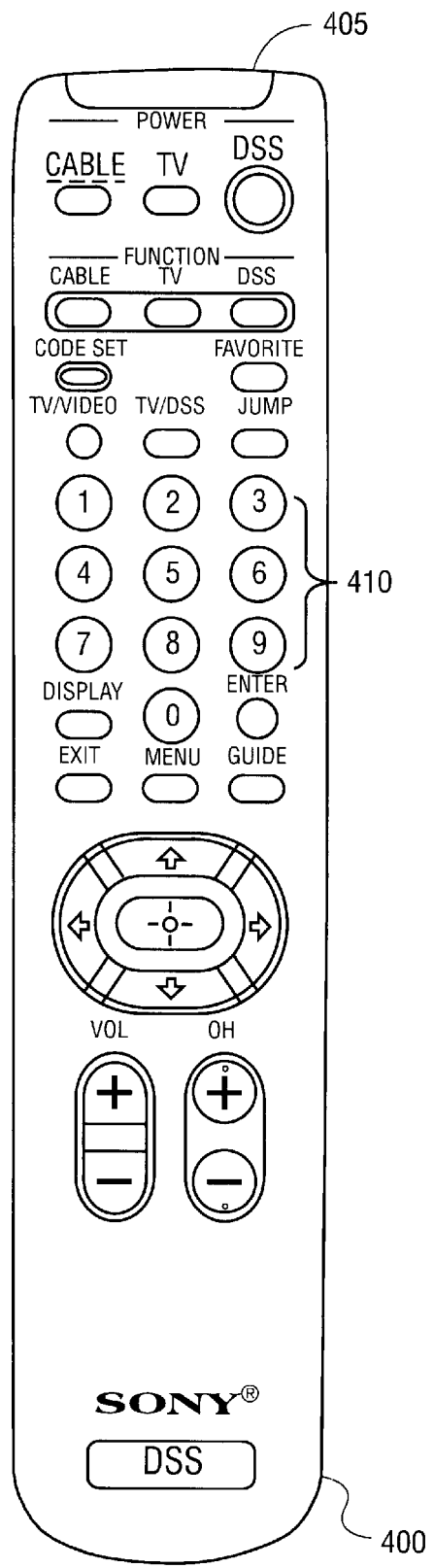
FIG. 3 is a representation of a remote control utilized to tune television stations in accordance with the teachings of the present invention.

FIG. 2 is a block diagram of the IRD 3. A radio frequency (RF) signal output from the LNB 3a of the antenna 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33, includes a central processing unit (CPU), a read-only memory (ROM) and a random access memory (RAM). The conditional access module determines whether the user has the authorization to receive certain data, e.g., audio/video for a pay TV station, using the authorization information stored in its memory. Thus, if the conditional access module determines that the user is authorized access, a key to decrypt the incoming data is provided to the transport IC 24, which decrypts the data using the key provided. In one embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. Dynamic random access memory (DRAM) 25a, connected to the MPEG video decoder 25, is used for buffering and storage of video data during processing by the MPEG video decoder. The decoded digital video signal is supplied to a National Television System Committee (NTSC) encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26a, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes instructions or code stored preferably in the ROM 37 to perform certain functions of the system. For example, the CPU processes certain data to control the display of EPGs and broadcasts in accordance with the teachings of the present invention. In addition, the CPU receives and processes the user input, received from the front panel buttons or switches 40 and the photodetector circuit 39 to provide the user functionality and access to the system described herein. Furthermore, the CPU accesses user settings/preferences for processing of information and configuration of the system. The user settings are stored in the non-volatile memory, such as electrically erasable programmable read-only memory (EEPROM) 38.

The CPU 29 maintains a list of pointers, stored in static random access memory (SRAM) 36, to the channel information and program information stored in the SRAM 51. Thus, when a user wishes to display a form of the EPG on the screen or selects to switch between a broadcast or an EPG, the CPU 29, accessing pointers stored in the SRAM 36, communicates to the transport IC 34 to retrieve the data from the data buffer (SRAM) 51 identified by the pointers. The CPU then formulates the format and other digital data which forms the guide or list on the screen and forwards the data representative of the guide/list to the transport IC 34 which forwards the data to the DRAM 25a of the MPEG video decoder 25 for subsequent output to the screen.

Figure 4:
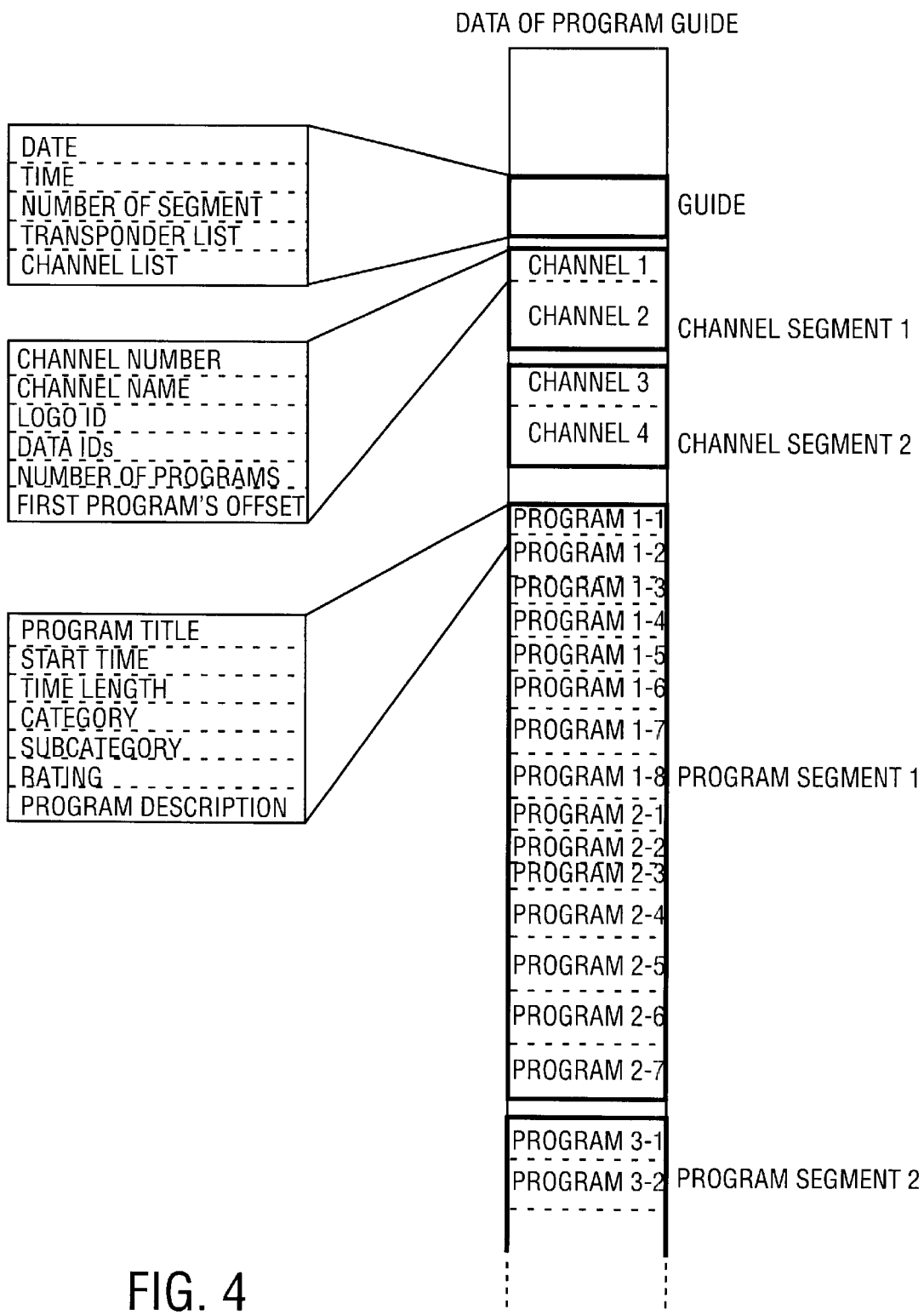
FIG. 4 illustrates the type of data utilized to present the electronic program guide in accordance with the teachings of the present invention.

FIG. 4 shows an example of a remote controller utilized by a user to transmit commands and make program selections in accordance with the teachings of the present invention. The remote controller 400 has an infrared originating device 405, a set of operation buttons 410, a CPU, a ROM and a RAM (not shown). The CPU receives a signal sent from an operation button 410 through an input port 430. The signal is processed according to a program stored in the ROM. The RAM is used as a working space so as to produce a transmitting code. The transmitting code is sent to the infrared originating device through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key.

FIG. 4 is a block diagram illustration of the data stored in a portion of the data buffer RAM 51. As noted above, the RAM 51 stores EPG data including guide data, channel data, and program data. General information is included in the guide data, for example, the current date and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's movies or baseball, basketball, football for the sports category, the movie rating and program description that provides a detailed description of the program.

Figure 5:
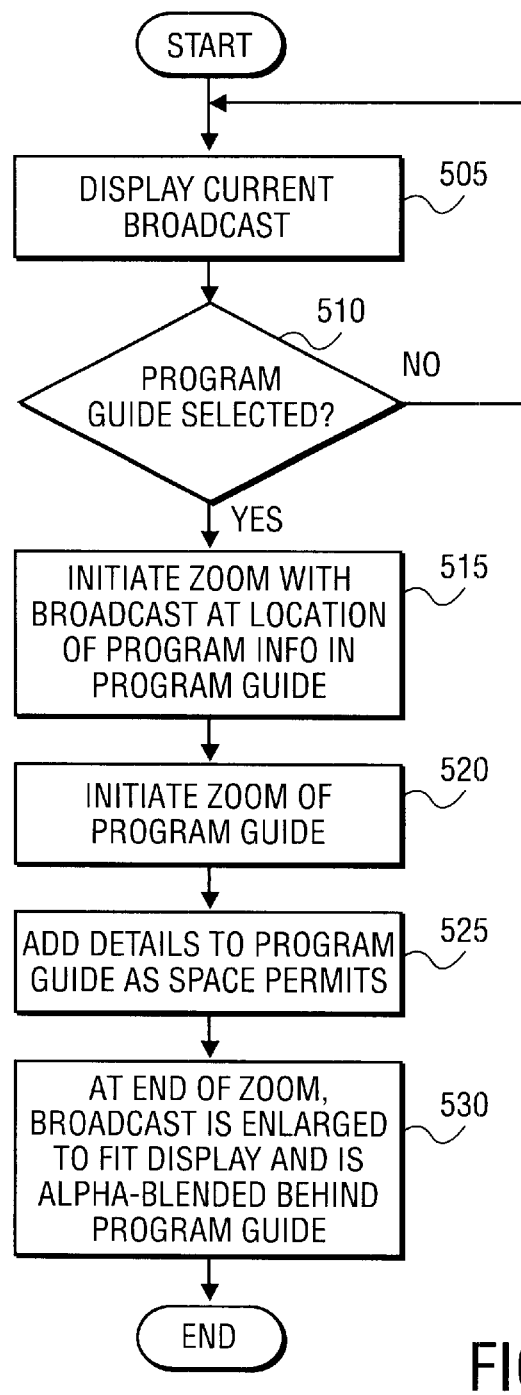
FIG. 5 is a flow diagram illustrating one embodiment of a process for transitioning between a broadcast and a program guide in accordance with the teachings of the present invention.

In one embodiment of the present invention, an animated zoom is performed between the image displayed (e.g., broadcast of a television program) and the electronic program guide (EPG). The process is described with reference to FIG. 5. At step 505, the display is generated. For example, in the present embodiment, a display of a television broadcast is generated. As noted above, the images generated can be also be images from alternate sources including video tapes, computer memory and storage devices or a network such as the Internet. Furthermore, the EPG can be generalized to be a variety of types of information guides not limited to broadcast system programming.

At step 510 it is determined whether the user has requested to view the program guide. Typically, a user may request to view particular information such as the program guide by selecting a button or sequence of buttons on the user's remote control device. Other techniques may also be used, including using menus or a cursor control device and corresponding displays.

If a user requests to view a program guide, at step 515, a zoom is initiated to transition the display between the broadcast and the EPG. By zooming between the broadcast and the EPG, the user is able to visually maintain a perspective as to what is occurring. In the present embodiment, the zoom is initiated by blending an oversized depiction of the EPG with the broadcast image wherein the broadcast image is sized to fit within an area of the EPG representative of the broadcast image displayed. For example, in the present embodiment, program start times and durations are depicted by a box with the name/description of the program included in the box. Thus, in the present embodiment, the broadcast image is sized to fit in the box corresponding to the program of the broadcast.

At step 520, the reduction in size of the EPG to a second size to approximately fit the display is initiated. As the size of the EPG is reduced, the broadcast image is similarly reduced to fit the size of the program area corresponding to the program displayed. At step 525, as the size of the EPG is reduced, optionally details are added to the EPG as space permits, for example, a description of the program. Alternately the detail is included at the beginning of the zoom and more and more of the detail is visible to the user as the EPG reduces in size.

The end of the zoom is reached once the EPG is at a determined size. Preferably the size is one that corresponds to the size of the display or a standard size that permits the user to scroll in either or both the horizontal and vertical direction. At the end of the zoom, at step 530, the broadcast is enlarged to fit the size of the display and is alpha-blended as background to the EPG. A variety of blending techniques known to those skilled in the art can be used to place the broadcast as a background image to the EPG. Thus the user continues to maintain a visual perspective throughout the transition between the broadcast and the EPG.

It should be realized that once in the EPG, it is preferred that the user can view a variety of programs simply by selection of the corresponding program area of the EPG. Thus, if the EPG is currently highlighting a first program area of the EPG and the user causes the highlight of a second program area, the background display will change to the broadcast of the corresponding second program. Similarly, it is preferred that when the user wishes to exit the EPG, the user has the choice to exit to the broadcast corresponding to the program currently highlighted in the EPG or to the initial broadcast at the time when the user selected to view the EPG. Other embodiments are also contemplated.

Figure 6:
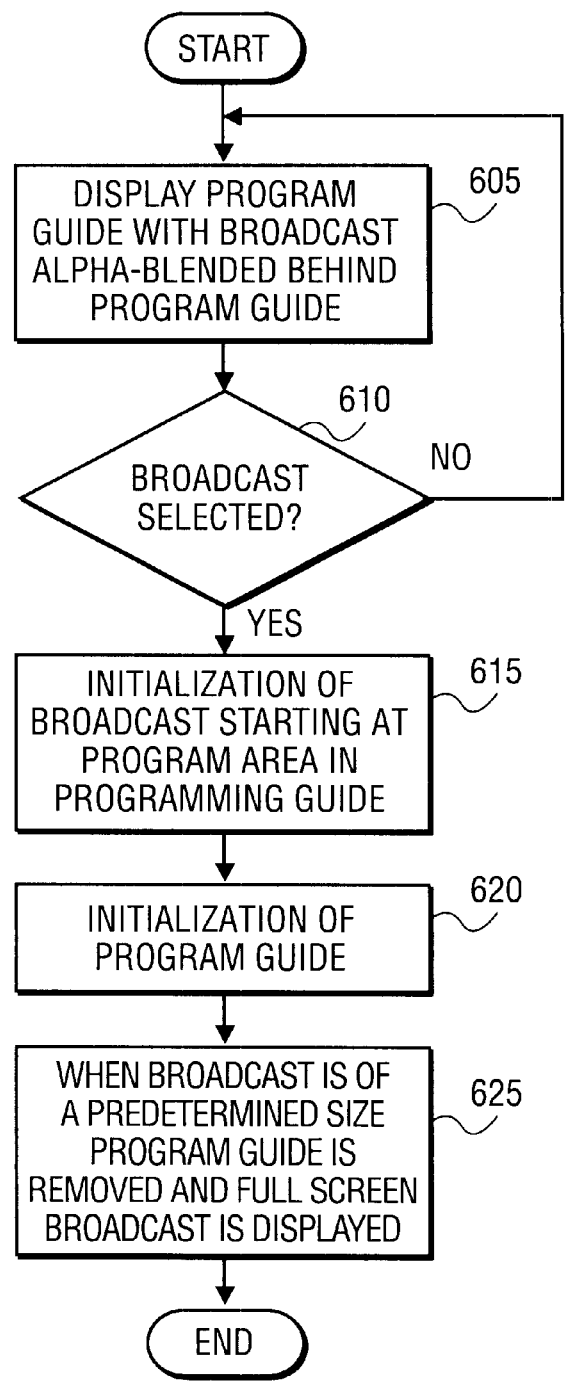
FIG. 6 is a flow diagram illustrating one embodiment of a process for transition between a program guide and a broadcast in accordance with the teachings of the present invention.

FIG. 6 illustrates and alternate embodiment which depicts a process for transitioning between the EPG and the broadcast. At step 605, the EPG and broadcast are initially displayed with the broadcast alpha-blended into the background of the EPG. At step 610, it is determined whether the EPG is to be exited. Typically, the is determined by the user selecting to exit the EPG; alternately, the EPG is automatically exited after a predetermined amount of time has lapsed. At step 615, the transition is initiated by sizing the broadcast to be displayed in the program area of the EPG and at step 620, a zoom out function is initiated increasing the EPG is size and correspondingly the size of the broadcast located within the program area of the EPG. Once the EPG has reached a determined size, e.g., a size such that the broadcast is approximately equal to the screen size, the EPG is removed and the broadcast is displayed, step 625.

Figure 7A:
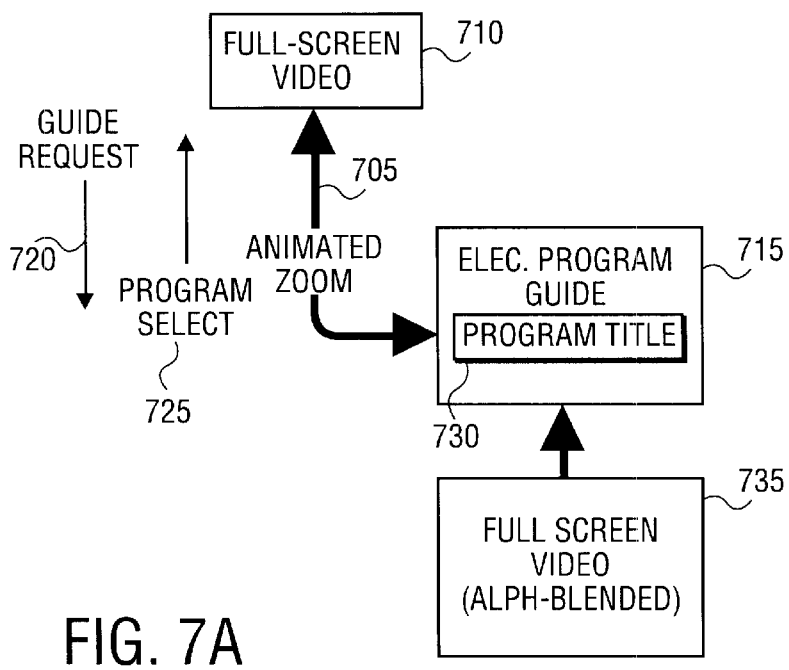
FIGS. 7a and 7b illustrate the transitional display in accordance with the teachings of the present invention.
Figure 7B:
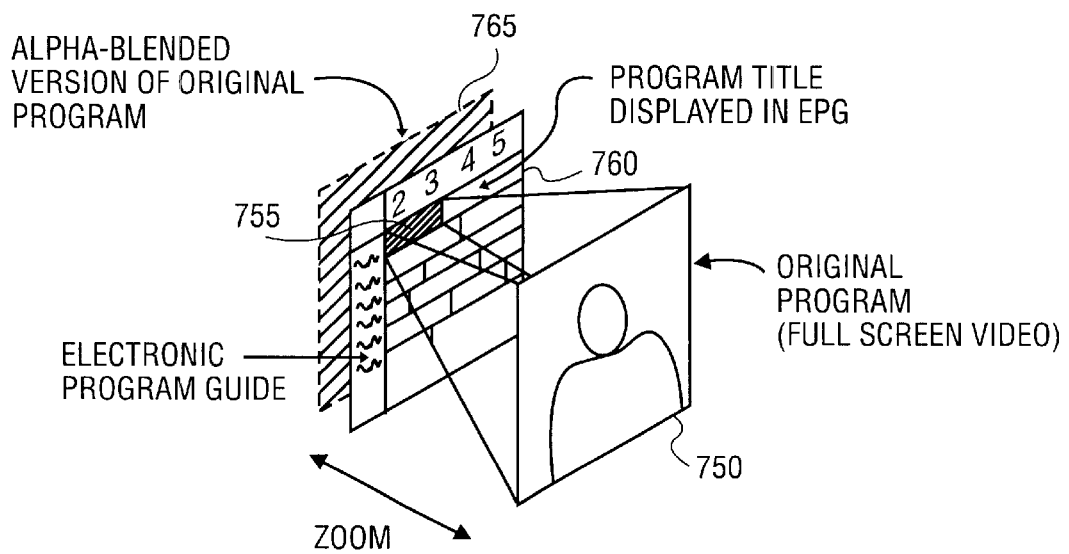

FIGS. 7a and 7b are used to further explain the process. FIG. 7a illustrates one embodiment in which an animated zoom 705 occurs between a full screen video image 710 and EPG 715, dependent upon whether a request to view the EPG 720 or program 725 is selected. As shown in FIG. 7a, the video is displayed in the program area 730 of the EPG 715 and full screen video is alpha blended 735 with the EPG 725 at the completion of the zoom. FIG. 7b is a screen depiction, illustrating how the video 750 is displayed within the program title area 755 of the EPG 760 and once the zoom is complete, the video 765 is alpha blended with the EPG 760.

Figure 8:
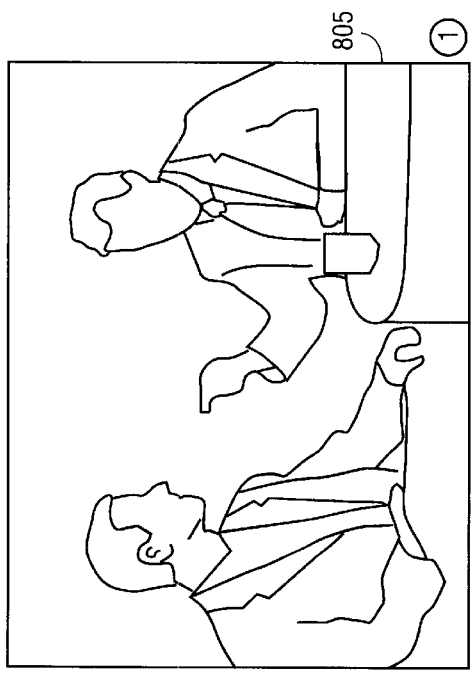
FIG. 8 illustrates a broadcast to program guide transition in accordance with the teachings of the present invention.

FIG. 8 are exemplary screen displays illustrating one embodiment of the process of the present invention. Display 805 illustrates a full screen display of a broadcast. Display 810 illustrates the initiation of the zoom in which an oversized version of the EPG is displayed, focusing in on the program title area of the EPG corresponding to the broadcast, with the broadcast displayed with the program title area. Display 815 illustrates the reduction in size of the EPG and corresponding reduction in size of the broadcast. Display 820 shows the completed transition wherein a full size screen display of the broadcast is alpha-blended in the background of the EPG.

Figure 9:
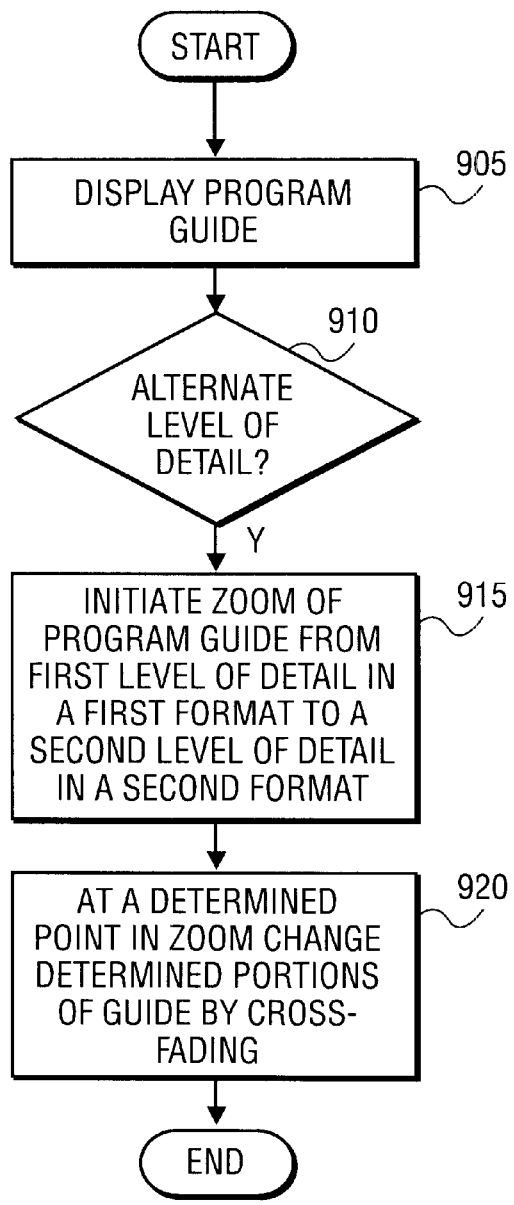
FIG. 9 is a flow diagram illustrating one embodiment of a process for changing the level of detail in a program guide.

FIG. 9 illustrates an embodiment of displaying different levels of detail of a program guide. Unlike prior art EPGs which typically present EPGs in one format, the present invention provides a zoom between a variety of formats or levels of detail such that the user can visually follow the process of transitioning between EPGs. At step 905, the EPG is displayed. Preferably the display is similar to one shown in FIG. 8, but the display can also consist simply of the EPG without the broadcast alpha-blended into the background or a reduced size EPG to enable the display of the broadcast at another portion of the screen.

If the viewer requests to view an alternate level of detail, step 910, the zoom is initiated, step 915. Preferably, the zoom is initiated by the user depressing a predetermined button, e.g., "zoom out" or "zoom in" button, on the remote control device. Other methods for indicating selection of a different level of detail may also be used. The zoom transitions the EPG from a first level of detail to a second level of detail. For example, the first level of detail may reflect a higher level of detail than the second level of detail or vice versa. The different levels of detail may reflect additional stations shown or programming times, or both. Thus, for example, if the second level of detail is greater than the first level of detail, the font size, the program title areas the areas spanned by certain periods of time may be reduced to fit the additional information. In the present embodiment, the zoom is performed by horizontal reduction by moving the displayed times closer together, adding additional times as space permits and vertical reduction by moving the station identifications and program title areas closer together, reducing the size of the program title areas as necessary. Furthermore, at step 920, at a determined point(s) in the zoom representations of certain portions of the EPG are changed to accommodate the different size of information represented. In particular, a cross-fade function is performed as the zoom occurs to change between, for example, a network station logo used at a first level of detail and a network station abbreviation used at a second level of detail. Using the cross-fade function, the change between representations is gradual and visible to the user.

Figure 10:
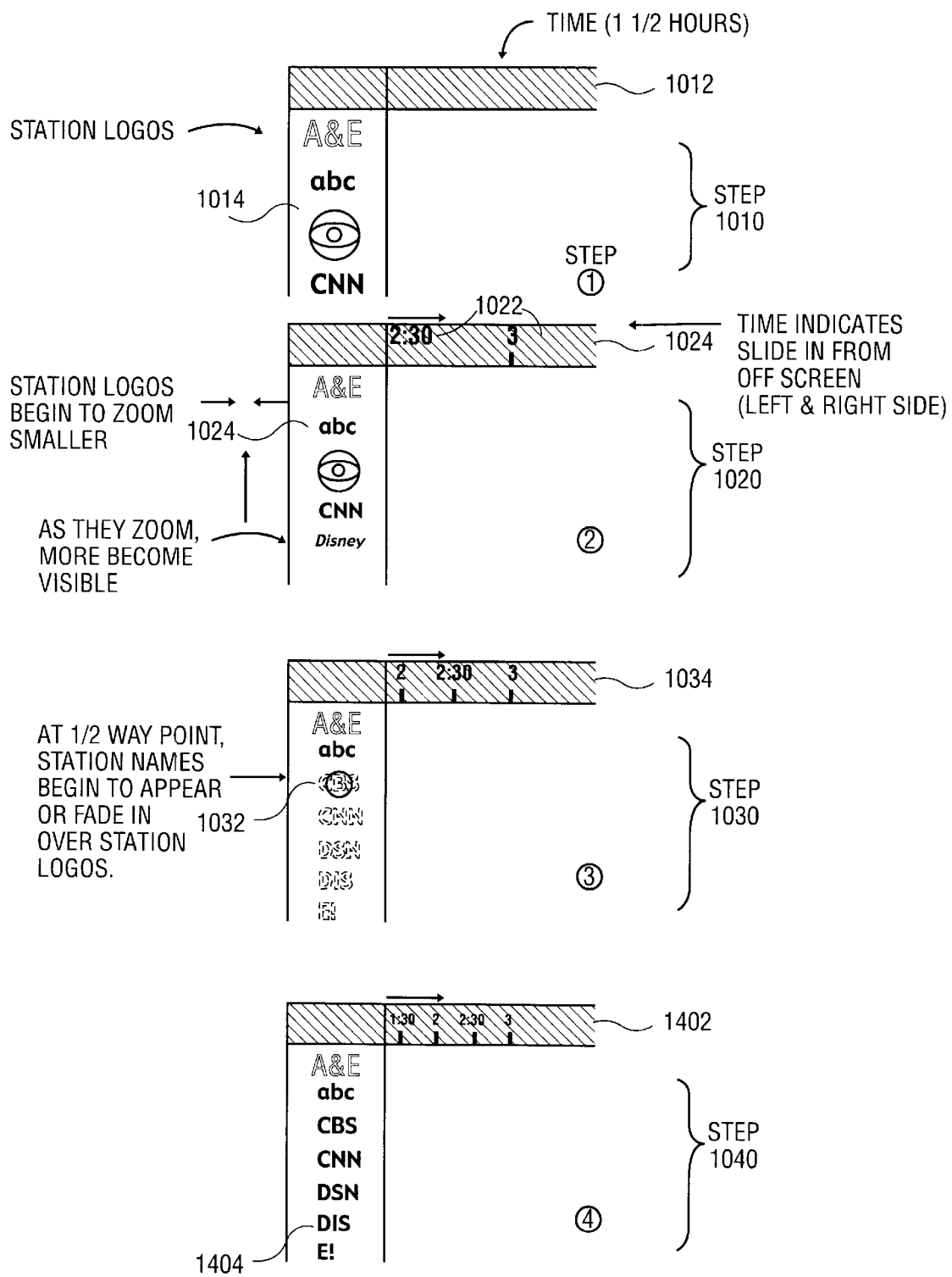
FIG. 10 is an example of a transition of a portion of the program guide to a different level of detail in accordance with the teachings of the present invention.

A simplified example of the process is illustrated in FIG. 10. At step 1010, the first level of EPG shows approximately 1.5 hours of programming in the time bar area 1012 and represents the different stations by network logos 1014. Step 1020 illustrates a first intermediate point in the zoom process in which the time indicators 1022, 1024 appear to slide in from off screen (e.g., from the right and left side) as the area spanned by each time tick is reduced. In addition, the station logos 1026 begin to zoom to a smaller size. At step 1030, which is representative of approximately the half-way point of the zoom process, station abbreviation 1032 appear to appear or fade over the station logos. The time indicators continue to "slide in" in the time bar area 1034. At step 1040 the zoom process in complete. It should be noted that the time bar area 1402 spans a greater time range than the prior level (step 1010) and the station identification area 1404 consists of station abbreviations in place of the station logos.

Figure 12:
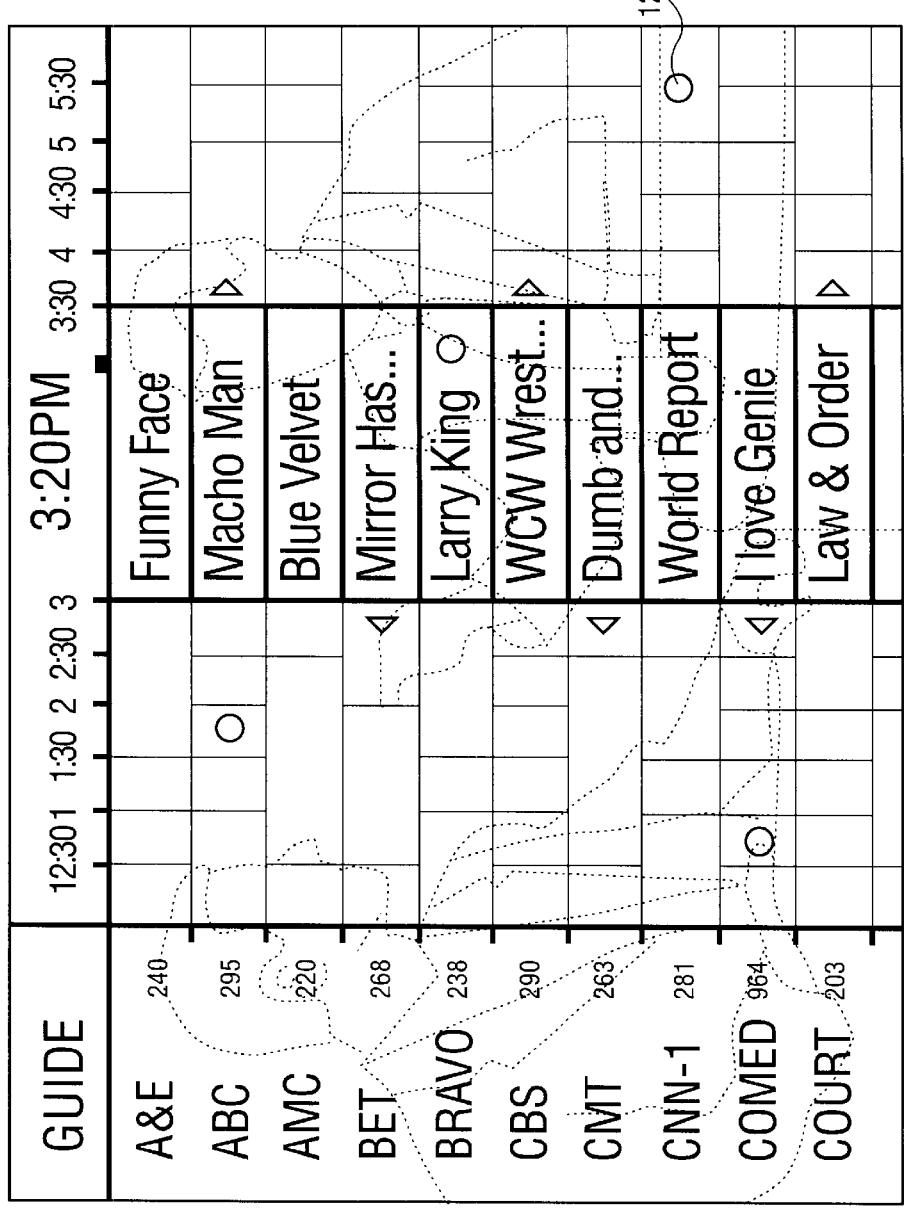
FIG. 12 illustrates the display of an electronic program guide at a second level of detail in one embodiment of the present invention.

FIGS. 11, 12 and 13 are examples of different levels of detail of an EPG. It is readily apparent that the present invention is not limited to these examples and other formats of information can be implemented following the teachings presented herein.

In addition, the guide is configured in this embodiment to note the status of certain programs and/or stations using a super-imposed icon over corresponding areas of the guide. For example, in the present embodiment, dots (e.g., 1205) are used. Other embodiments may also be used. The status may reflect a variety of things, including, but not limited to, favorite stations, favorite programs, auto-recording and auto-tuning.

FIG. 11 illustrates a 1.5 hour program guide with station logo display showing seven channels of programming and their logos. It is often desirable to use the logo display as it is readily identifiable by the user. However when it is reduced in size the logos are not always readily identifiable as the image is blurred by size reduction. Thus, at a higher level of detail where more program information is presented, station abbreviations are used in place of logos, such as is shown in FIG. 12. FIG. 12 shows a 6 hour program display that includes 10 channels of programming. Preferably, the user accesses this guide by pressing a zoom out function while in the 1.5 hour view of the EPG.

FIG. 13 shows a 1 day program display with an alphabetical directory of stations. As explained above, this display is reached by the user selecting a zoom out function and the system performing a zoom function. In this zoom, the time ticks earlier used are replaced by the "morning", "afternoon", "evening" and "late night" time representations shown, preferably by performing the fade-in function described above. Similarly, the station abbreviations are preferably replaced by alphabetical directory using the fade in function. Note that the present illustration shows each letter of the alphabet separately; it is contemplated that ranges of letters, e.g. A–C, D–F, etc. may also be used.

The invention has been described in conjunction with the preferred embodiment. It is evident that numerous alternatives, variations, modifications and uses will be apparent to one skilled in the art in view of the foregoing description.

What is claimed is:

1. A method for transitioning between an image and an information guide, said method comprising the steps of:
   displaying an image;
   receiving a first control signal indicating that the information guide is to be displayed;
   generating a display of an oversized representation of the information guide, said display comprising a first area corresponding to the image displayed;
   displaying the image in the first area;
   performing a zoom from the oversized representation to a second representation of a second size, the size of the displayed image changing with a change in size of the first area; and
   when the zoom is complete, removing the displayed image from the first area and blending a full screen size of the displayed image as background to the information guide.

2. The method as set forth in claim 1, wherein the step of blending comprises alpha-blending the full screen image as background to a full screen display of the information guide.

3. The method as set forth in claim 1, wherein the oversized representation is of a size such that the first area spans a majority of a full screen display.

4. The method as set forth in claim 1, wherein the zoom is an animated zoom.

5. The method as set forth in claim 1, wherein the image comprises video images received from a broadcast system and the information guide comprises an electronic program guide.

6. The method as set forth in claim 1, further comprising the steps of:
   receiving a second control signal indicating a change in a level of detail of the information guide; and
   performing a zoom from a display of a first level of detail of the information guide to a second level of detail of the information guide.

7. The method as set forth in claim 6, further comprising the step of switching representations of determined portions of the information guide from a first format to a second format at a determined point during the zoom.

8. The method as set forth in claim 7, wherein the step of switching comprises performing a cross-fade function.

9. The method as set forth in claim 7, wherein the first format comprises logos and a second format comprises alphabetical representations of determined portions.

10. The method as set forth in claim 6, wherein a portion of the information guide comprises a time bar spanning an identified period of time, said step of zooming comprising changing the duration of the period of time by compressing or expanding time ticks during the zoom.

11. The method as set forth in claim 6, wherein the image is a broadcast image and the information guide comprises an electronic program guide.

12. A method for transitioning between an information guide and an image, said method comprising the steps of:
   displaying on a screen display a first representation of the information guide of a first size;
   receiving a first control signal indicating that the image is to be displayed;
   generating a display of the information guide comprising a first area corresponding to the image to be displayed and displaying the image in the first area;
   performing a zoom from the first representation to a second representation of a second size, the size of the displayed image changing with a change in size of the first area, the second size of a size such that the first area covers a substantial portion of the screen display; and
   when the zoom is complete, removing the information display and displaying a full screen size of the displayed image.

13. The method as set forth in claim 12, wherein the image is a broadcast image and the information guide comprises an electronic program guide.

14. The method as set forth in claim 12, wherein the first representation comprises the image blended as background to the information guide and the method further comprising the step of removing the background image from display when the first control signal is received.

15. A system comprising:
   a first receiver configured to receive an image;
   a second receiver configured to for receive a first control signal;
   a controller configured to display the image and when a first control signal is received, generating a display of an oversized representation of the information guide, said display comprising a first area corresponding to the image displayed, displaying the image in the first area, performing a zoom from the oversized representation to a second representation of a second size, the size of the displayed image changing with a change in size of the first area, and when the zoom is complete, removing the displayed image from the first area and blending a full screen size of the displayed image as background to the information guide.

16. The system as set forth in claim 15, wherein the first receiver is a broadcast system receiver and the image comprises a video image.

17. The system as set forth in claim 15, wherein the second receiver receives the first control signal from a remote control device.

18. The system as set forth in claim 15, wherein the image comprises a broadcast image and the information guide comprises an electronic program guide.

19. The system as set forth in claim 15, wherein the controller is configured to blend using an alpha-blending function.

20. The system as set forth in claim 15, wherein the oversized representation is of a size such that the first area spans a majority of a full screen display.

21. The system as set forth in claim 15, wherein the controller is configured to zoom using an animated zoom function.

22. The system as set forth in claim 15, wherein:
   said second receiver further configured to receive a second control signal indicating a change in a level of detail of the information guide; and
   said controller further configured to perform a zoom from a display of a first level of detail of the information guide to a second level of detail of the information guide.

23. The system as set forth in claim 22, wherein the controller is further configured to switch representations of determined portions of the information guide from a first format to a second format at a determined point during the zoom.

24. The system as set forth in claim 23, wherein the controller is configured to switch using a cross-fade function.

25. The system as set forth in claim 23, wherein the first format of determined portions comprises logos and a second format of determined portions comprises alphabetical representations.

26. The system as set forth in claim 22, wherein the image comprises a broadcast image and the information guide comprises an electronic program guide.

27. The system as set forth in claim 22, wherein a portion of the information guide comprises a time bar spanning an identified period of time, and said controller is configured to zoom to change the duration of the period of time by compressing or expanding time ticks during the zoom.

28. The system as set forth in claim 15, wherein the controller is further configured to, when a third control signal is received, remove the background display of the image, display the image in the first area of the information guide, performing a zoom from the second representation of the second size to a representation of a third size such that the first area spans a substantial portion of the screen display, and when the zoom is complete, remove the information display and display a full screen display of the image.

29. A computer readable medium containing executable instructions which, when executed in a processing system, causes the system to perform the steps for transitioning between an image and an information guide comprising:
   displaying an image;
   receiving a first control signal indicating that the information guide is to be displayed;
   generating a display of an oversized representation of the information guide, said display comprising a first area corresponding to the image displayed;
   displaying the image in the first area;
   performing a zoom from the oversized representation to a second representation of a second size, the size of the displayed image changing with a change in size of the first area; and
   when the zoom is complete, removing the displayed image from the first area and blending a full screen size of the displayed image as background to the information guide.

30. The computer readable medium as set forth in claim 29, further comprising instructions, which when executed blend by alpha-blending the full screen image as background to a full screen display of the information guide.

31. The computer readable medium as set forth in claim 29, wherein the oversized representation is of a size such that the first area spans a majority of a full screen display.

32. The computer readable medium as set forth in claim 29, wherein the zoom is an animated zoom.

33. The computer readable medium as set forth in claim 29, wherein the image comprises video images received from a broadcast system and the information guide comprises an electronic program guide.

34. The computer readable medium as set forth in claim 29, further comprising instructions which when executed perform the steps of:

receiving a second control signal indicating a change in a level of detail of the information guide; and performing a zoom from a display of a first level of detail of the information guide to a second level of detail of the information guide.

35. The computer readable medium as set forth in claim 34, further comprising instructions which when executed perform the step of switching representations of determined portions of the information guide from a first format to a second format at a determined point during the zoom.

36. The computer readable medium as set forth in claim 35, wherein the step of switching comprises performing a cross-fade function.

37. The computer readable medium as set forth in claim 35, wherein the first format comprises logos and a second format comprises alphabetical representations of determined portions.

38. The computer readable medium as set forth in claim 34, wherein a portion of the information guide comprises a time bar spanning an identified period of time, said instructions for performing the step of zooming comprises instructions that change the duration of the period of time and compress or expand time ticks during the zoom.

39. The computer readable medium as set forth in claim 34, wherein the image is a broadcast image and the information guide comprises an electronic program guide.

40. A computer readable medium containing executable instructions which, when executed in a processing system, causes the system to perform the steps for transitioning between an image and an information guide comprising:

displaying on a screen display a first representation of the information guide of a first size;

receiving a first control signal indicating that the image is to be displayed;

generating a display of the information guide comprising a first area corresponding to the image to be displayed and displaying the image in the first area;

performing a zoom from the first representation to a second representation of a second size, the size of the displayed image changing with a change in size of the first area, the second size of a size such that the first area covers a substantial portion of the screen display; and when the zoom is complete, removing the information display and displaying a full screen size of the displayed image.

41. The computer readable medium as set forth in claim 40, wherein the image is a broadcast image and the information guide comprises an electronic program guide.

42. The computer readable medium as set forth in claim 40, wherein the first representation comprises the image blended as background to the information guide and further comprising instructions, which when executed perform the step of removing the background image from display when the first control signal is received.

* * * * *